United States Patent
Fukasawa

(10) Patent No.: US 8,542,392 B1
(45) Date of Patent: Sep. 24, 2013

(54) PRINT CONTROL APPARATUS, IMAGE FORMING SYSTEM, AND NON-TRANSITORY COMPUTER-READABLE MEDIUM

(71) Applicant: Fuji Xerox Co., LTD, Tokyo (JP)

(72) Inventor: Hajime Fukasawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/688,924

(22) Filed: Nov. 29, 2012

(51) Int. Cl.
  *G06F 3/12* (2006.01)
  *G06K 15/02* (2006.01)
  *H04N 1/00* (2006.01)

(52) U.S. Cl.
  USPC ........ 358/1.15; 358/1.14; 358/1.16; 358/501; 358/401; 399/81

(58) Field of Classification Search
  None
  See application file for complete search history.

(56) References Cited

U.S. PATENT DOCUMENTS

| | | | |
|---|---|---|---|
| 2005/0128521 A1* | 6/2005 | Takahashi | 358/1.15 |
| 2006/0061797 A1* | 3/2006 | Kondo | 358/1.14 |
| 2006/0114492 A1* | 6/2006 | Noda | 358/1.14 |
| 2006/0285146 A1* | 12/2006 | Yang | 358/1.13 |
| 2007/0171454 A1* | 7/2007 | Takahashi et al. | 358/1.14 |
| 2011/0109941 A1* | 5/2011 | Kasai et al. | 358/1.16 |

FOREIGN PATENT DOCUMENTS

| | | |
|---|---|---|
| JP | A-10-254619 | 9/1998 |
| JP | A-2006-268313 | 10/2006 |

* cited by examiner

*Primary Examiner* — King Poon
*Assistant Examiner* — Beniyam Menberu
(74) *Attorney, Agent, or Firm* — Oliff & Berridge, PLC

(57) ABSTRACT

A print control apparatus included an accepting unit, a generating unit, a transmission unit, a display, a determination unit, and a display controller. The accepting unit accepts a print request. The generating unit generates, on the basis of the print request, print data for outputting an image onto printing paper. The transmission unit transmits the print data to a printing apparatus. The display displays a list of print requests accepted by the accepting unit, together with process states of the print requests. The determination unit determines whether a progress speed with which processes based on the print requests are to be completed is not lower than a value. In a case where an operation instruction unit is displayed on the display, when it is determined that the progress speed is not lower than the value, the display controller performs control of disabling the operation instruction unit.

5 Claims, 12 Drawing Sheets

FIG. 10

| Print-Job Name | Process State | Print Start Time | |
|---|---|---|---|
| Job 100001 | Printing | (0.1 seconds later) | ⎫ |
| Job 100002 | Waiting for printing | (0.1 seconds later) | ⎪ |
| Job 100003 | Waiting for printing | (0.2 seconds later) | ⎪ |
| Job 100004 | Waiting for printing | (0.2 seconds later) | ⎪ |
| Job 100005 | Waiting for printing | (0.3 seconds later) | ⎪ |
| Job 100006 | Waiting for printing | (0.3 seconds later) | ⎬ PRINT JOBS WHOSE PRINT START TIMES ARE TO OCCUR WITHIN 60 SECONDS |
| Job 100007 | Waiting for printing | (0.4 seconds later) | ⎪ |
| Job 100008 | Waiting for printing | (0.4 seconds later) | ⎪ |
| Job 100009 | Waiting for printing | (0.5 seconds later) | ⎪ |
| Job 100010 | Waiting for printing | (0.5 seconds later) | ⎪ |
| Job 100011 | Processing | (0.6 seconds later) | ⎪ |
| Job 100012 | Processing | (0.6 seconds later) | ⎪ |
| Job 100013 | Processing | (0.7 seconds later) | ⎪ |
| . | . | . | |
| . | . | . | |
| . | . | . | |
| Job 119999 | Waiting for processing | (59.8 seconds later) | |
| Job 120001 | Waiting for processing | (59.9 seconds later) | ⎭ |
| Job 120002 | Waiting for processing | (60.0 seconds later) | ⎫ |
| Job 120003 | Waiting for processing | (60.1 seconds later) | ⎪ |
| Job 120004 | Waiting for processing | (60.1 seconds later) | ⎪ |
| Job 120005 | Waiting for processing | (60.2 seconds later) | ⎬ PRINT JOBS WHOSE PRINT START TIMES ARE TO OCCUR WHEN OR AFTER 60 SECONDS ELAPSE |
| Job 120006 | Waiting for processing | (60.2 seconds later) | ⎪ |
| Job 120007 | Waiting for processing | (60.3 seconds later) | ⎪ |
| Job 120008 | Waiting for processing | (60.3 seconds later) | ⎪ |
| Job 120009 | Waiting for processing | (60.4 seconds later) | ⎪ |
| Job 120010 | Waiting for processing | (60.4 seconds later) | ⎪ |
| Job 120011 | Receiving data | (60.5 seconds later) | ⎭ |
| . | . | . | |
| . | . | . | |

PRINT CONTROL APPARATUS, IMAGE FORMING SYSTEM, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2012-071342 filed Mar. 27, 2012.

BACKGROUND

Technical Field

The present invention relates to a print control apparatus, an image forming system, and a non-transitory computer-readable medium.

SUMMARY

According to an aspect of the invention, there is provided a print control apparatus including an accepting unit, a generating unit, a transmission unit, a display, a determination unit, and a display controller. The accepting unit accepts a print request. The generating unit generates, on the basis of a print request accepted by the accepting unit, print data for outputting an image onto printing paper. The transmission unit transmits print data generated by the generating unit to a printing apparatus. The display displays a list of multiple print requests accepted by the accepting unit, together with process states of the individual print requests. The determination unit determines whether or not a progress speed that is a speed with which processes based on the multiple print requests are to be completed is equal to or higher than a set value. In a case where an operation instruction unit that is used to instruct performance of a process for a print request selected in the list of the print requests is displayed on the display, when it is determined by the determination unit that the progress speed is equal to or higher than the set value, the display controller performs control of disabling the operation instruction unit that is displayed.

BRIEF DESCRIPTION OF THE DRAWINGS

An exemplary embodiment of the present invention will be described in detail based on the following figures, wherein:

FIG. 10 is a diagram illustrating an example of a table listing the process states of all print jobs that are managed inside the controller;

DETAILED DESCRIPTION

Next, an exemplary embodiment of the present invention will be described in detail. with reference to the drawings.

Figure 1:
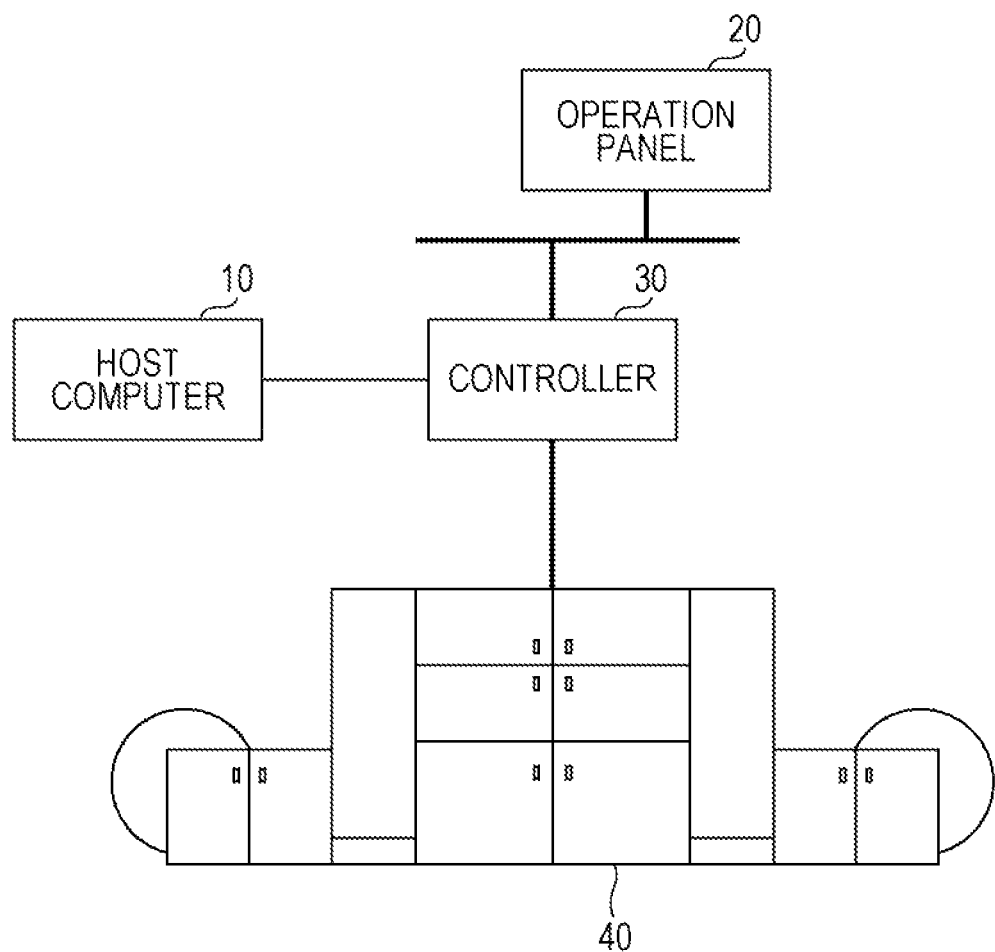
FIG. 1 is a diagram illustrating a system configuration of a printing system according to an exemplary embodiment of the present invention.

FIG. 1 is a block diagram illustrating a configuration of a printing system according to an exemplary embodiment of the present invention.

As illustrated in FIG. 1, the printing system according to the exemplary embodiment of the present invention includes a host computer 10 that generates and outputs print jobs, an operation panel 20, a controller (a print control apparatus) 30, and a printing apparatus 40 that performs print processes on continuous-form paper. Note that, although it is described in the present exemplary embodiment that the operation panel 20 and the controller 30 are independently configured, the operation panel 20 may be included as a component in the controller 30.

Figure 2:
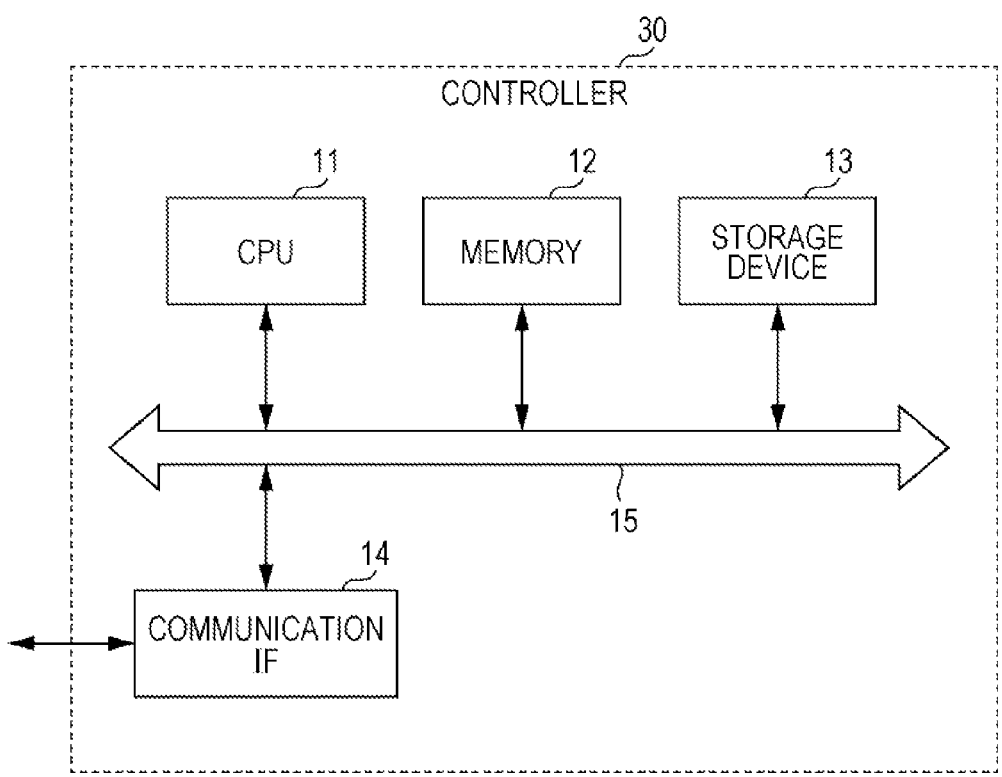
FIG. 2 is a block diagram illustrating a hardware configuration of a controller in the exemplary embodiment of the present invention.

Next, a hardware configuration of the controller 30 in the printing system according to the present exemplary embodiment is illustrated in FIG. 2.

As illustrated in FIG. 2, the controller 30 includes a control processing unit (CPU) 11, a memory 12, a storage device 13 such as a hard disk drive (HDD), and a communication interface (IF) 14 that performs transmission and reception of data between an external apparatus or the like and the controller 30 via a network. These components are connected to each other via a control bus 15.

The CPU 11 performs a predetermined process in accordance with a control program that is stored in the memory 12 or the storage device 13, thereby controlling an operation of the controller 30. Note that, although it is descried in the present exemplary embodiment that the CPU 11 reads and executes the control program stored in the memory 12 or the storage device 13, the control program may be stored on a storage medium such as a compact disc read only memory (CD-ROM), and may be supplied to the CPU 11.

Figure 3:
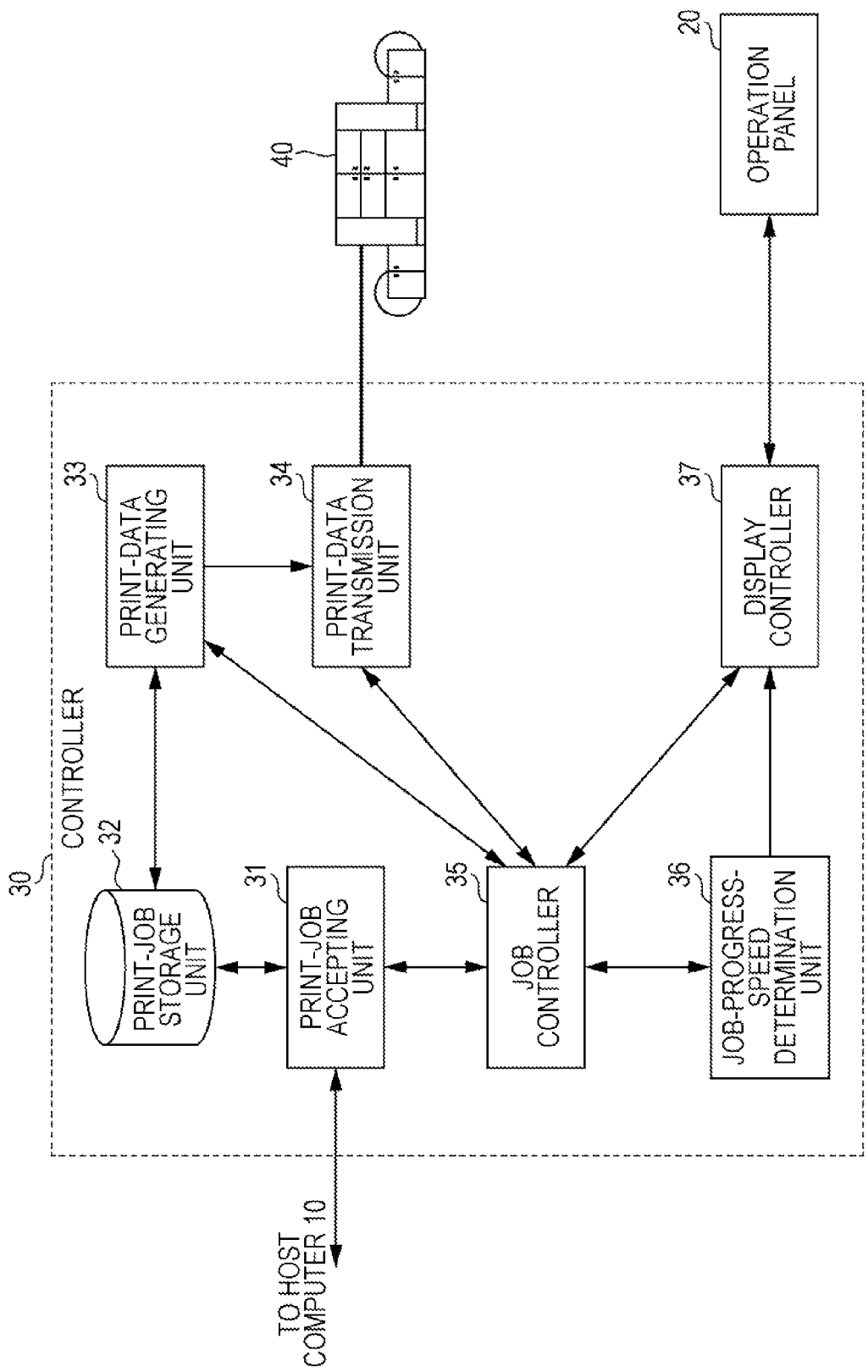
FIG. 3 is a block diagram illustrating a functional configuration of the controller in the exemplary embodiment of the present invention.

FIG. 3 is a block diagram illustrating a functional configuration of the controller 30 that is realized by executing the control program.

As illustrated in FIG. 3, the controller 30 in the present exemplary embodiment includes a print-job accepting unit 31, a print-job storage unit 32, a print-data generating unit 33, a print-data transmission unit 34, a job controller 35, a job-progress-speed determination unit 36, and a display controller 37.

The print-job accepting unit 31 sequentially accepts print jobs (print requests) that have been transmitted from the host computer 10.

The print-job storage unit 32 stores the print jobs accepted by the print-job accepting unit 31.

The print-data generating unit 33 generates print data for outputting images on printing paper, on the basis of the print jobs that have been accepted by the print-job accepting unit 31 and that have been stored by the print-job storage unit 32. More specifically, the print-data generating unit 33 generates, as print data, image data in a raster format on the basis of the print jobs accepted by the print-job accepting unit 31.

The print-data transmission unit 34 transmits the print data, which has been generated by the print-data generating unit 33, to the printing apparatus 40. Then, the printing apparatus 40 outputs, on printing paper, images based on the print data transmitted by the print-data transmission unit 34.

The job controller 35 controls processes for print jobs that are being processed in the print-job accepting unit 31, the Print-data generating unit 33, and the print-data transmission unit 34, and monitors the progress states of the print jobs.

The display controller 37 performs control of displaying, on the operation panel 20, a display screen of a list of the multiple print jobs accepted by the print-job accepting unit 31, together with the process states of the individual print jobs. Furthermore, the display controller 37 performs control of displaying, on the operation panel 20, operation buttons (an operation instruction unit) that are used to instruct performance of various types of processes for a print job that is selected in this list of the print jobs.

Figure 4:
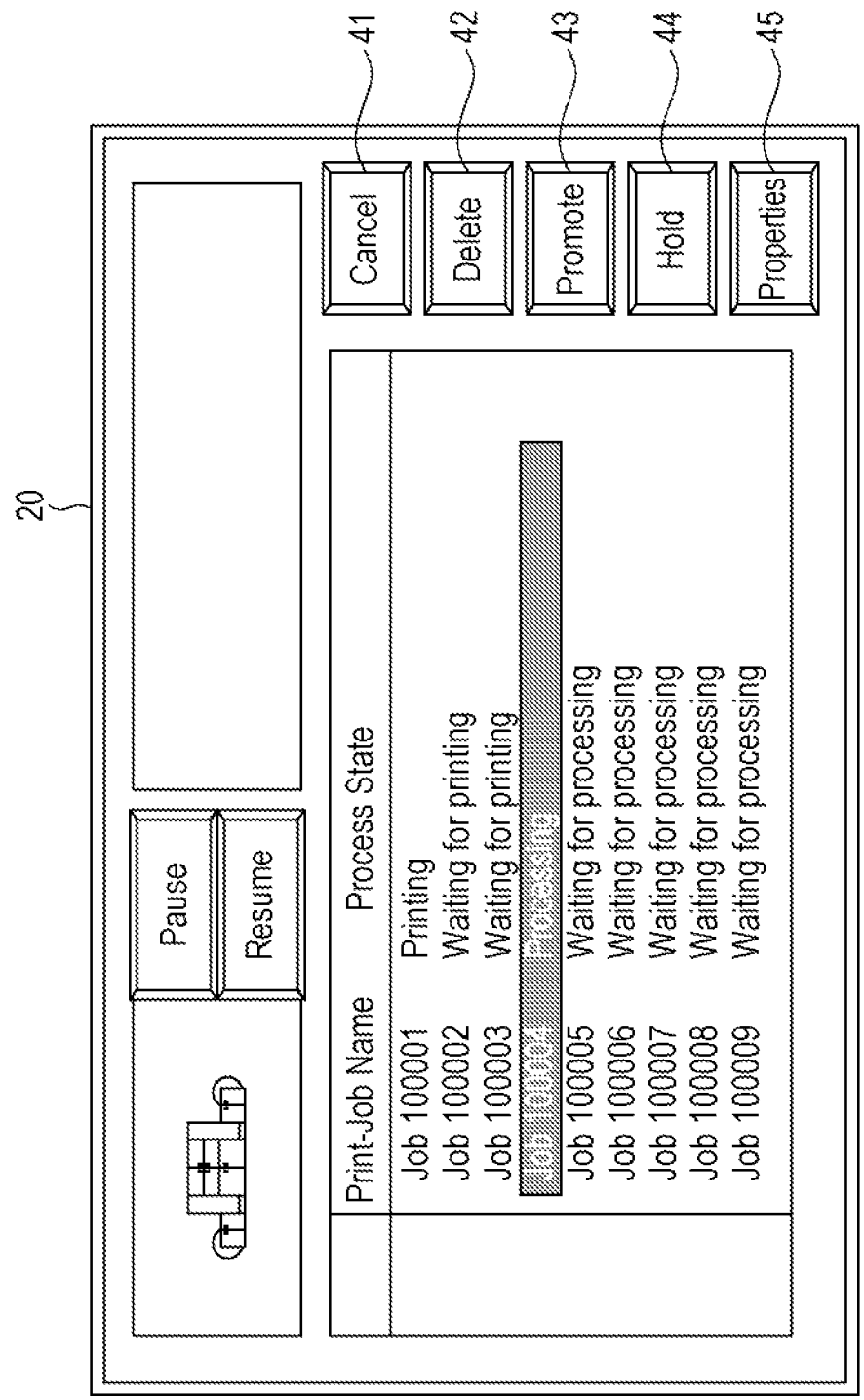
FIG. 4 is a diagram illustrating an example of a display screen, which is displayed on an operation panel, of a list of print jobs.

Examples of a display screen of the list of print jobs and the operation buttons, which are displayed on the operation panel 20, are illustrated in FIG. 4. In the display screen of the list of print jobs illustrated in FIG. 4, the print-job names of print jobs and the process states of the print jobs are displayed as a list. For example, it is indicated that the process state of a print job whose job name is "job 100001" is a "Printing" state. Furthermore, on the operation panel 20, various types of operation buttons 41 to 45 that are used to, for example, cancel or delete a selected print job are displayed. In the example of the display screen illustrated in FIG. 4, it is indicated that a print job whose job name is "job 100004" is selected by changing the display of the print job in such a manner that the color of characters is inverted from black to white and the color of the background is inverted from white to black.

Here, the term "Printing" implies that a print process based on generated print data is being performed in the printing apparatus 40, i.e., a state in which "printing is being performed". Furthermore, the term "Waiting for printing" implies that print data has been generated, and implies a state of waiting for a print process to be performed in the printing apparatus 40. Moreover, the term "Processing" implies a state in which print data is being generated in the print-data generating unit 33 on the basis of an accepted print job. Additionally, the term "Waiting for processing" implies a state in which print data is to be generated in the print-data generating unit 33, i.e., a state in which a print job is stored in the print-job storage unit 32. Furthermore, the term "Held" may be displayed as a process state although it is not illustrated in FIG. 4. The term "Held" implies a state in which an instruction to hold a print job without performing a print process is provided.

Moreover, among the operation buttons 41 to 45 displayed on the operation panel 20, the operation button 41 displayed as a "Cancel" button is used to instruct performance of a process for cancelling a print process for a selected print job. Moreover, the operation button 42 displayed as a "Delete" button is used to instruct performance of a process of deleting a selected print job. Note that, regarding a print job for which a print process has been cancelled by the "Cancel" button, a message saying that the print job has been cancelled remains in a history. However, regarding a print job that has been deleted, nothing regarding the print job remains in the history, and the print job is completely deleted. Then, the operation button 43 displayed as a "Promote" button is used to instruct performance of a process of performing a print process for a selected print job preferentially before print processes are performed for other print jobs. Moreover, the operation button 44 displayed as a "Hold" button is used to instruct performance of a process of stopping a print process for a selected print job and holding the print job as is. Regarding a print job for which a holding instruction is provided by the "Hold" button, the term "Held" is displayed as the process state of the print job. The operation button 45 displayed as a "Properties" button is used to instruct display of property information concerning a selected print job.

The job-progress-speed determination unit 36 receives information concerning the progress states at individual print jobs from the job controller 35, and determines whether or not a progress speed that is a speed with which print processes based on the individual print jobs are to be completed is equal to or higher than a set value. For example, when the number of print jobs for which print processes were completed within sixty seconds is equal to or larger than fifteen, the job-progress-speed determination unit 36 determines that the progress speed is equal to or higher than the set value and is a high speed. When the number of print jobs for which print processes were completed within sixty seconds is equal to or smaller than fourteen, the job-progress-speed determination unit 36 determines that the progress speed is equal to or lower than the set value and is a low speed.

Then, when it is determined by the job-progress-speed determination unit 36 that the progress speed is equal to or higher than the set value, the display controller 37 performs control of disabling the operation buttons 41 to 45 that are displayed on the operation panel 20.

However, even when it is determined by the job-progress-speed determination unit 36 that the progress speed for the print jobs is equal to or higher than the set value, in the case where only print jobs whose process states are each the "Held" state are displayed on the operation panel 20, the display controller 37 may perform control of enabling the operation buttons 41 to 45 that are displayed.

Furthermore, the display controller 37 performs control of displaying, on the operation panel 20, print start times that indicate estimated periods of time to be taken before print processes for the print jobs start, together with the process states of the individual print jobs. Even when it is determined by the job-progress-speed determination unit 36 that the progress speed for the print jobs is equal to or higher than the set value, in the case where a print job for which it is necessary to wait a period of time before printing starts, the period of time being equal to or longer than a set period of time, is selected, the display controller 37 may perform control of enabling the operation buttons 41 to 45.

Next, an operation performed in the controller 30 in the present exemplary embodiment will be described in detail with reference to FIG. 5.

Figure 5:
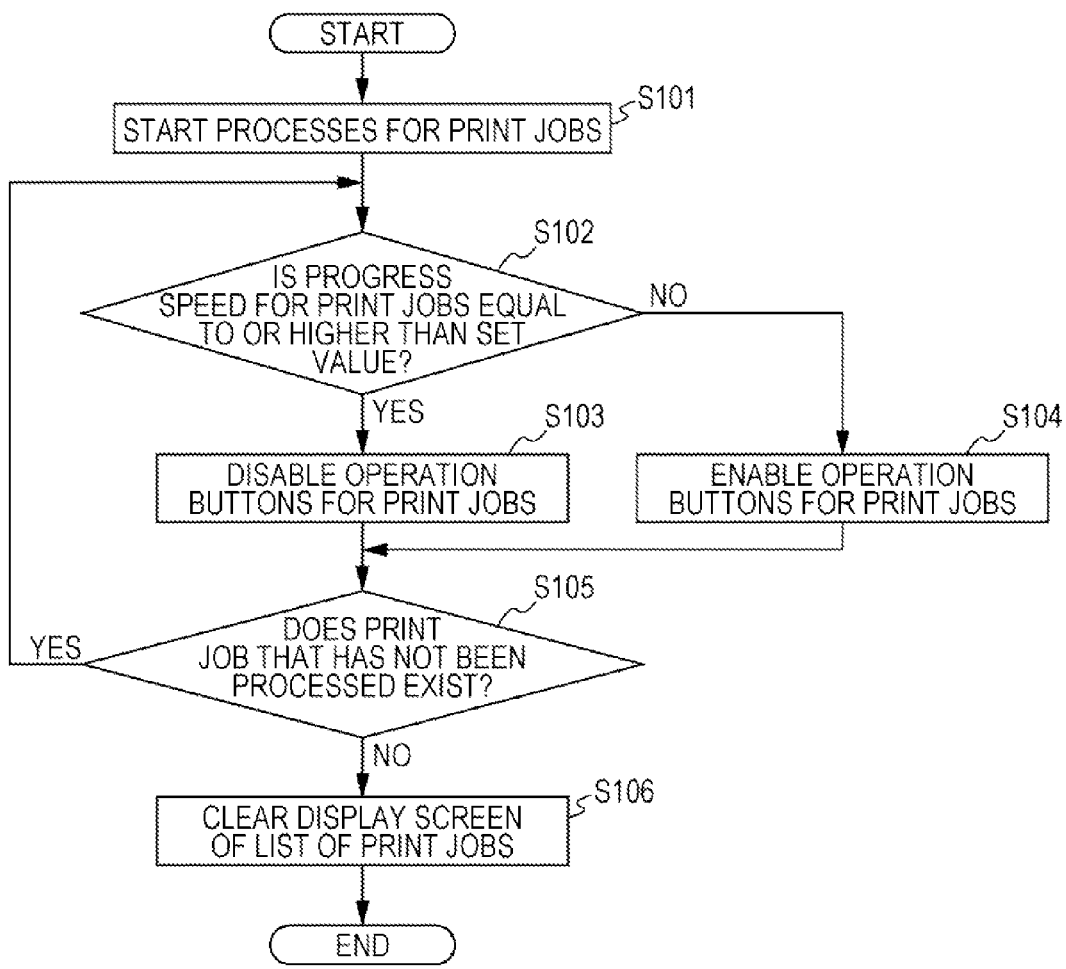
FIG. 5 is a flowchart illustrating an operation in the case where a display controller in the exemplary embodiment of the present invention performs display of a display screen of the list of print jobs.

FIG. 5 is a flowchart illustrating an operation in the case where the display controller 37 in the present exemplary embodiment performs display of a display screen of the list of print jobs.

First, when print jobs are transmitted from the host computer 10 and received by the print-job accepting unit 31, the job controller 35 controls the print-data generating unit 33 and so forth so as to start processes for the received print jobs (step S101).

Then, the job-progress-speed determination unit 36 receives information concerning the progress states of the individual print jobs from the job controller 35, and determines whether or not the progress speed, which is a speed with which the processes based on the print jobs are to be completed, is equal to or higher than the set value. (step S102).

In step S102, when it is determined that the progress speed is equal to or higher than the set value (YES in step S102), the display controller 37 disables the operation buttons 41 to 45 that are used to instruct performance of processes for the print jobs (step S103).

Furthermore, in step S102, when it is determined that the progress speed is lower than the set value (NO in step S102), the display controller 37 enables the operation buttons 41 to 45 that are used to instruct performance of processes for the print jobs (step S104).

Then, when a print job that has not been processed exists, the processes of steps S102 to S104 are repeatedly performed (step S105). Then, when processes for all of the print jobs have finished (NO in step S105), the display controller 37 clears the display screen of the list of the print jobs, and finishes the process (step S106).

Next, a state in which the operation buttons 41 to 45 are disabled by the display controller 37 will be described with reference to FIG. 6.

Figure 6:
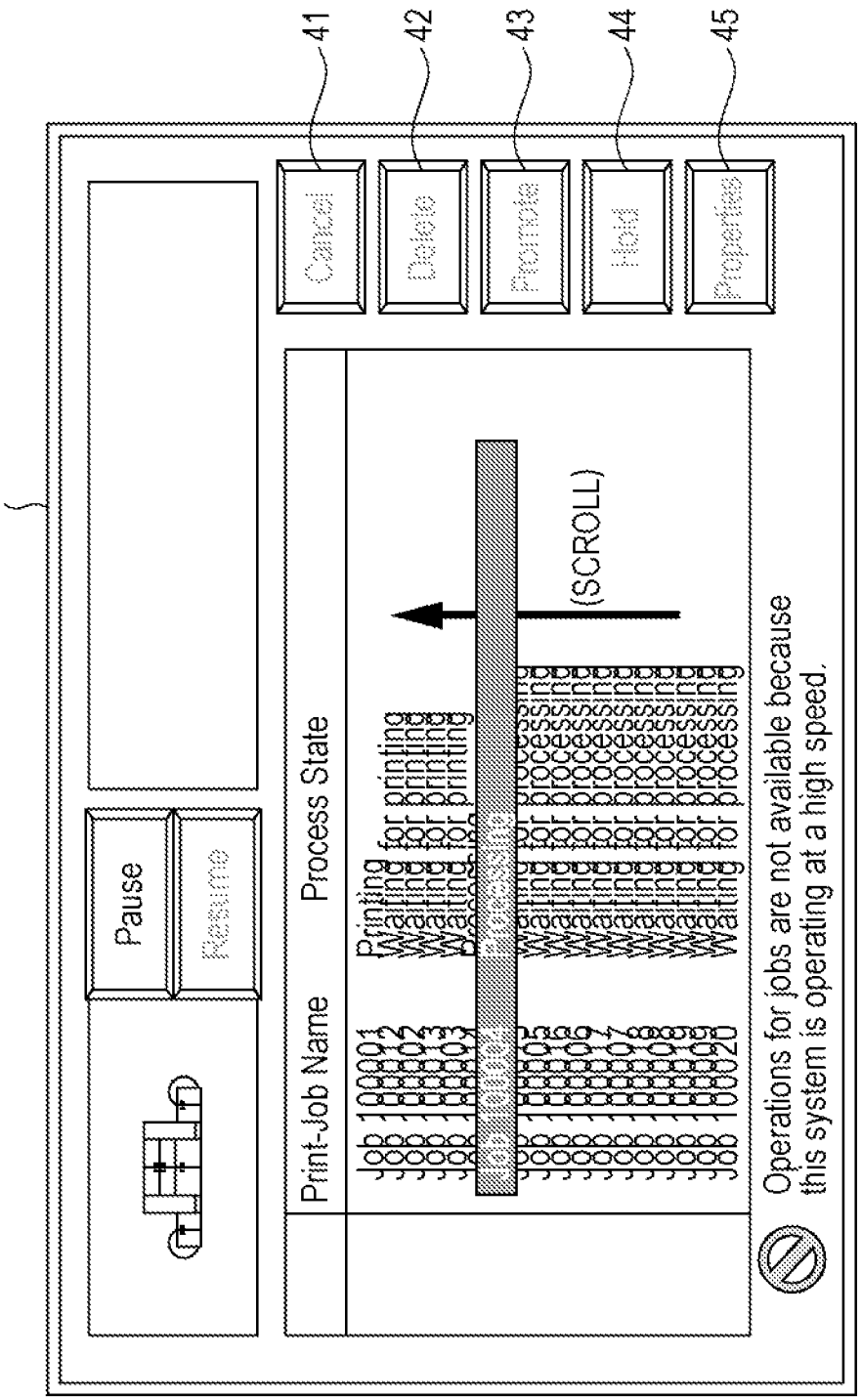
FIG. 6 is a diagram for explaining a state in which operation buttons are disabled by the display controller.

In an example of a display screen illustrated in FIG. 6, a case is illustrated, in which a display screen of the list of print jobs is displayed when print processes of a continuous-form printer that is capable of performing high-speed printing with a print speed such as 2500 pages/minute are controlled.

In the case where the display screen of the list of print jobs is displayed, print jobs for which print processes have been completed disappear one by one from the display screen of the list of print jobs. Accordingly, the contents displayed in the display screen of the list of print jobs scroll in accordance with the progress of the print processes. Consequently, in the display screen of the list of print jobs, in the case were the print processes of the continuous-form printer that is capable of performing high-speed printing with a print speed such as 2500 pages/minute are controlled, the contents displayed in the display screen scroll with a speed at which the contents displayed in the display screen are not visually recognizable.

For example, in the case where print processes for multiple print jobs that each include one page are performed, when the print processes are performed by a high-speed continuous-form printer having a print speed of 2500 pages/minute (≈42 pages/second), processes for forty or more print jobs are completed within one second. Thus, in such a case were the progress speed is high, when a printing system is designed so that a print job is selectable in the list of print jobs and operations are available, it is highly probable that misoperation will occur.

However, in such a case where the progress speed for print processes is high, the controller 30 included in the printing system according to the present exemplary embodiment disables the operation buttons 41 to 45 displayed on the operation panel 20 as illustrated in FIG. 6. Note that, in FIG. 6, the operation buttons 41 to 45 that are in a disabled state, which is a state of not accepting any input even when the operation buttons 41 to 45 are operated, are displayed with reduced color density of characters, such as characters in the case of "Cancel" and "Delete". Furthermore, in the example illustrated in FIG. 6, a note "Operations for jobs are not available because this system is operating at a high speed" is displayed, whereby a user can recognize that the operation buttons 41 to 45 are disabled.

Note that, as described above, when it is determined by the job-progress-speed determination unit 36 that the progress speed is equal to or higher than the set value, the display controller 37 may enable an operation to be performed for a print job whose process state is the "Held" state or a print job whose print start time is to occur when or after the set period of time elapses, instead of disabling operations for all print jobs.

An operation of the display controller 37 in the case where such control is performed will be described with reference to a flowchart of FIG. 7.

Figure 7:
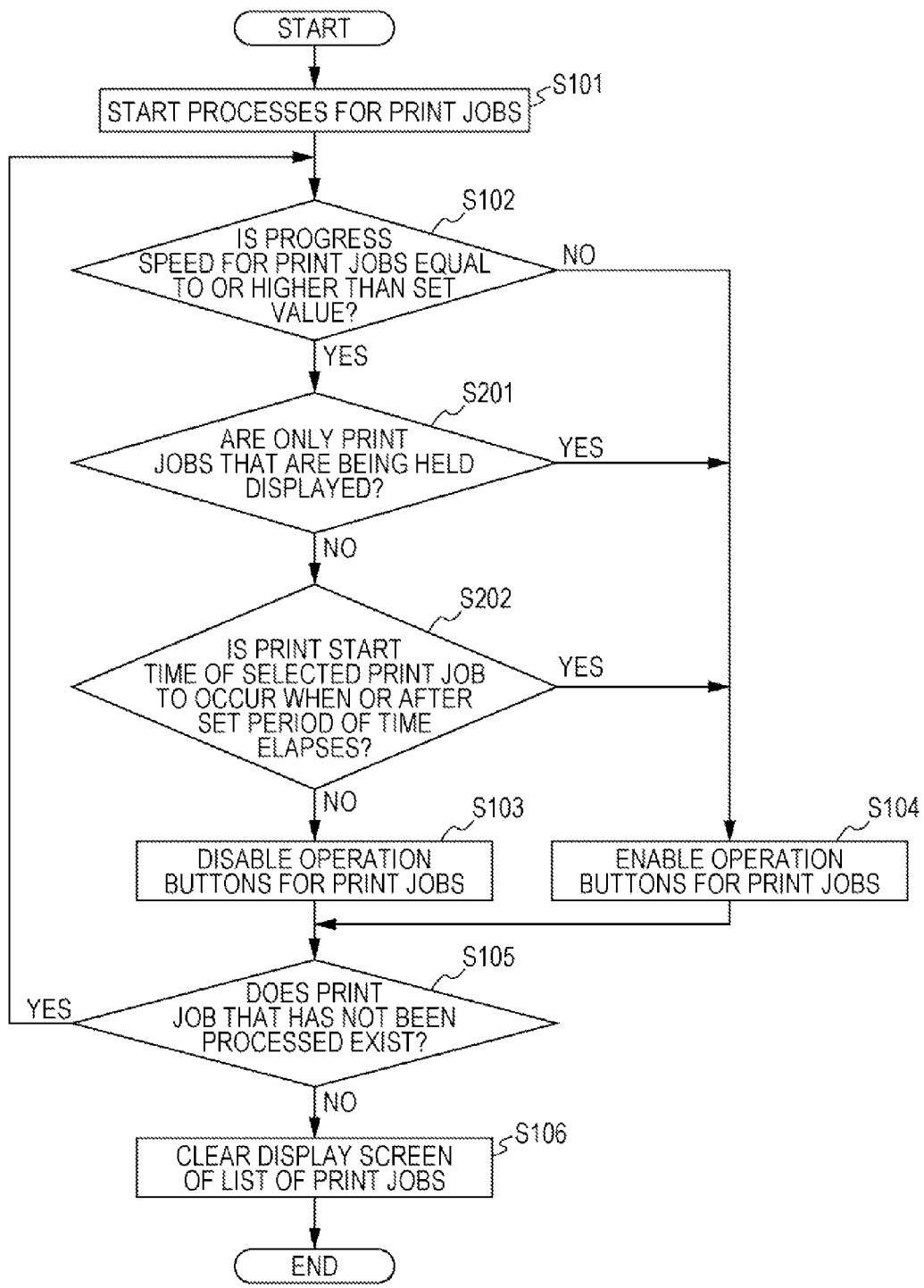
FIG. 7 is a flowchart for explaining an operation of the display controller in the case where control is performed, in which an operation for a print job whose process state is a "Held" state or a print job for which it is necessary to wait a period of time before printing starts, the period of time being equal to or longer than a set period of time, is enabled to be performed.

The flowchart of FIG. 7 is obtained by adding the processes of steps S201 and S202 to the flowchart of FIG. 5. Accordingly, a description of the other steps will be omitted.

Even when it is determined that the progress speed is equal to or hither than the set value (YES in step S102), in the case where only print jobs whose process states are each the "Held" state are displayed (YES in step S201), or in the case where the print start time of a selected print job is to occur when or after the set period of time (for example, 60 or more seconds) elapses (YES in step S202), the display controller 37 enables the operation buttons 41 to 45 that are used to instruct performance of processes for the print jobs (step S104).

Examples of display screens displayed on the operation panel 20 in the case where such control is performed will be described with reference to FIGS. 8 to 12.

First, an example of a display screen in the case where, when only print jobs whose process states are each the "Held" state are displayed, the operation buttons 41 to 45 that are used to instruct performance of processes for the print jobs are enabled will be described with reference to FIGS. 8 and 9.

Figure 8:
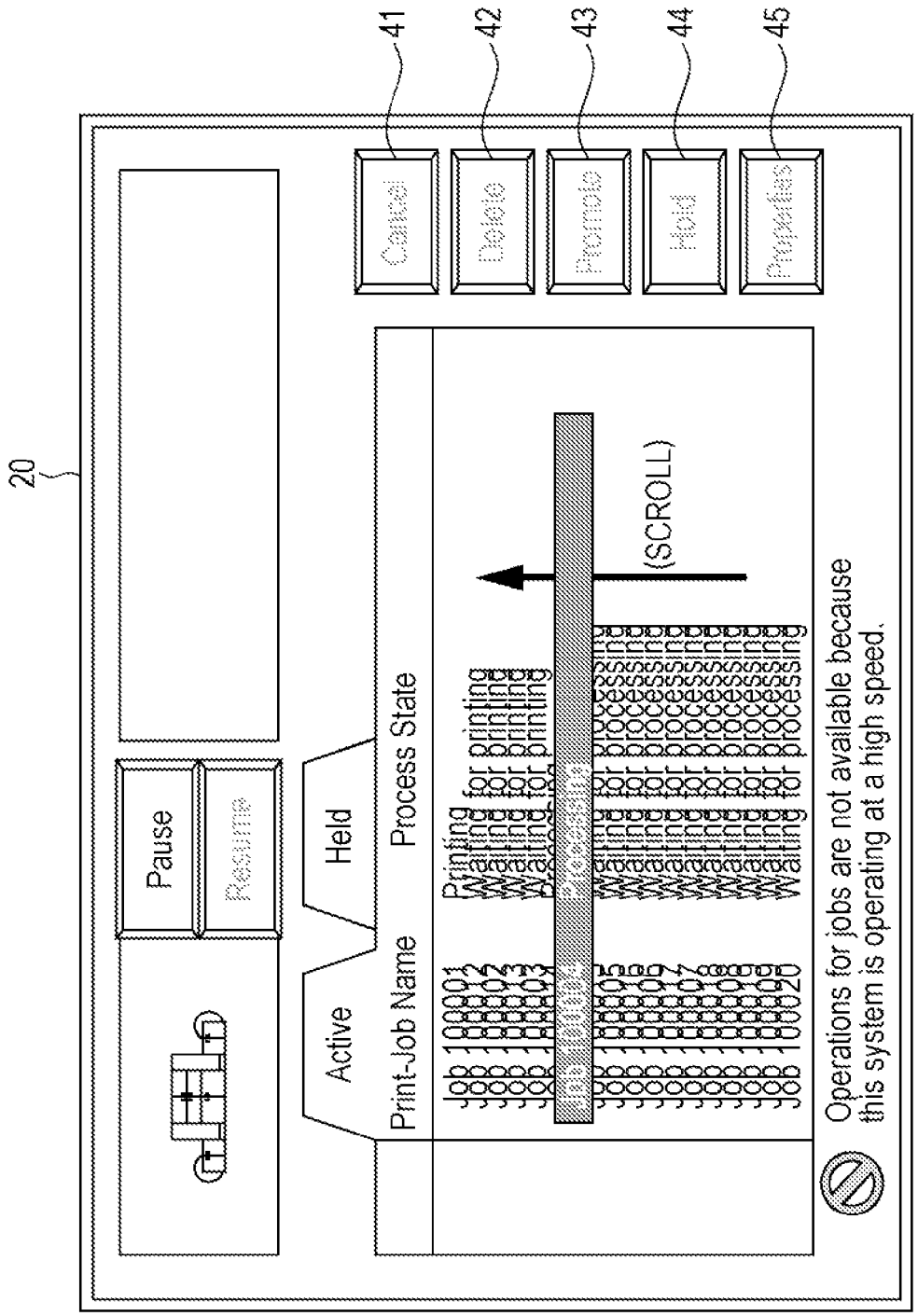
FIG. 8 is a diagram illustrating an example of a display screen in the case where a display screen of a list of print jobs that are being performed is selected and it is determined by a job-progress-speed determination unit that a progress speed is equal to or higher than a set value.
Figure 9:
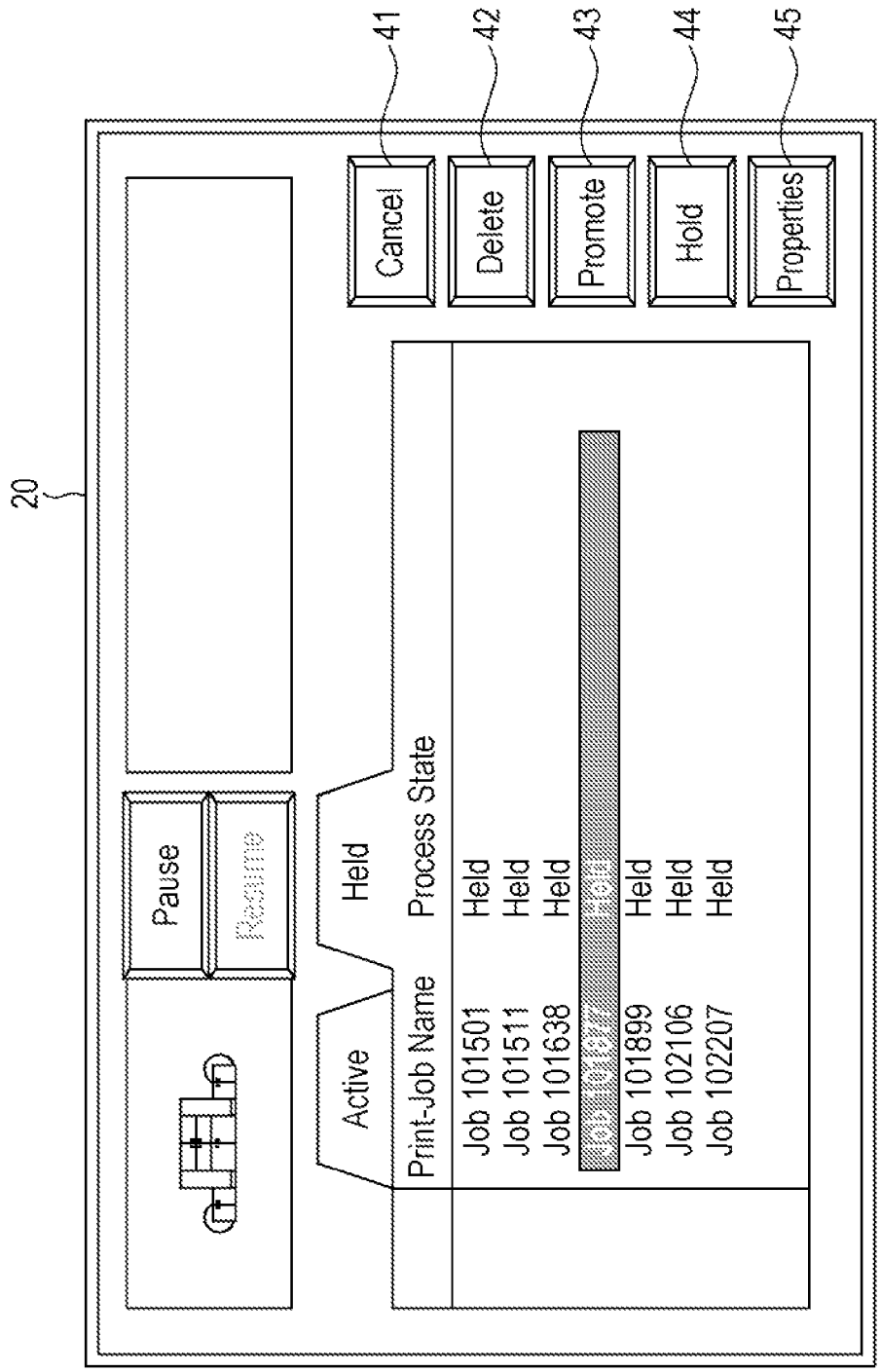
FIG. 9 is a diagram illustrating an example of the display screen in the case where a display screen of a list of print jobs that are being held is selected and it is determined by the job-progress-speed determination unit that the progress speed is equal to or higher than the set value.

In FIGS. 8 and 9, examples of a display screen in the case where switching between a display screen of a list of print jobs that are being held and a display screen of a list of print jobs that are not being held but being performed can be performed using tabs are illustrated.

In FIG. 8, an example of the display screen in the case where the display screen of the list of print jobs that are being performed is selected and it is determined by the job-progress-speed determination unit 36 that the progress speed is equal to or higher than the set value is illustrated. Accordingly, in FIG. 8, the operation buttons 41 to 45 are disabled.

In contrast, in FIG. 9, because the display screen of the list of print jobs that are being held is selected, even when it is determined by the job-progress-speed determination unit 36 that the progress speed is equal to or higher than the set value, the operation buttons 41 to 45 are set so as to be enabled. Accordingly, for example, a print job whose job name is "job 101877" is selected, and performance of various types of processes may be instructed using the operation buttons 41 to 45.

Next, an example of a display screen in the case where, when the print start time of a selected print job is to occur when or after the set period of time elapses, the operation buttons 41 to 45 that are used to instruct performance of processes for the print job are enabled will be described with reference to FIGS. 10 to 12.

FIG. 10 is a diagram illustrating an example of a table listing the process states of all print jobs that are managed inside the controller 30. In FIG. 10, the print-job names of print jobs, the print process states thereof, and the print start times thereof are listed. Each of the print start times indicates an estimated period of time to be taken before a print process for the corresponding print job starts.

Here, a case will be described, in which, even when the progress speed is equal to or higher than the set value, operations using the operation buttons 41 to 45 are available for a print job whose print start time is to occur within 60 seconds, but operations using the operation buttons 41 to 45 are not available for a print job whose print start time is to occur when or after 60 seconds elapse.

Figure 11:
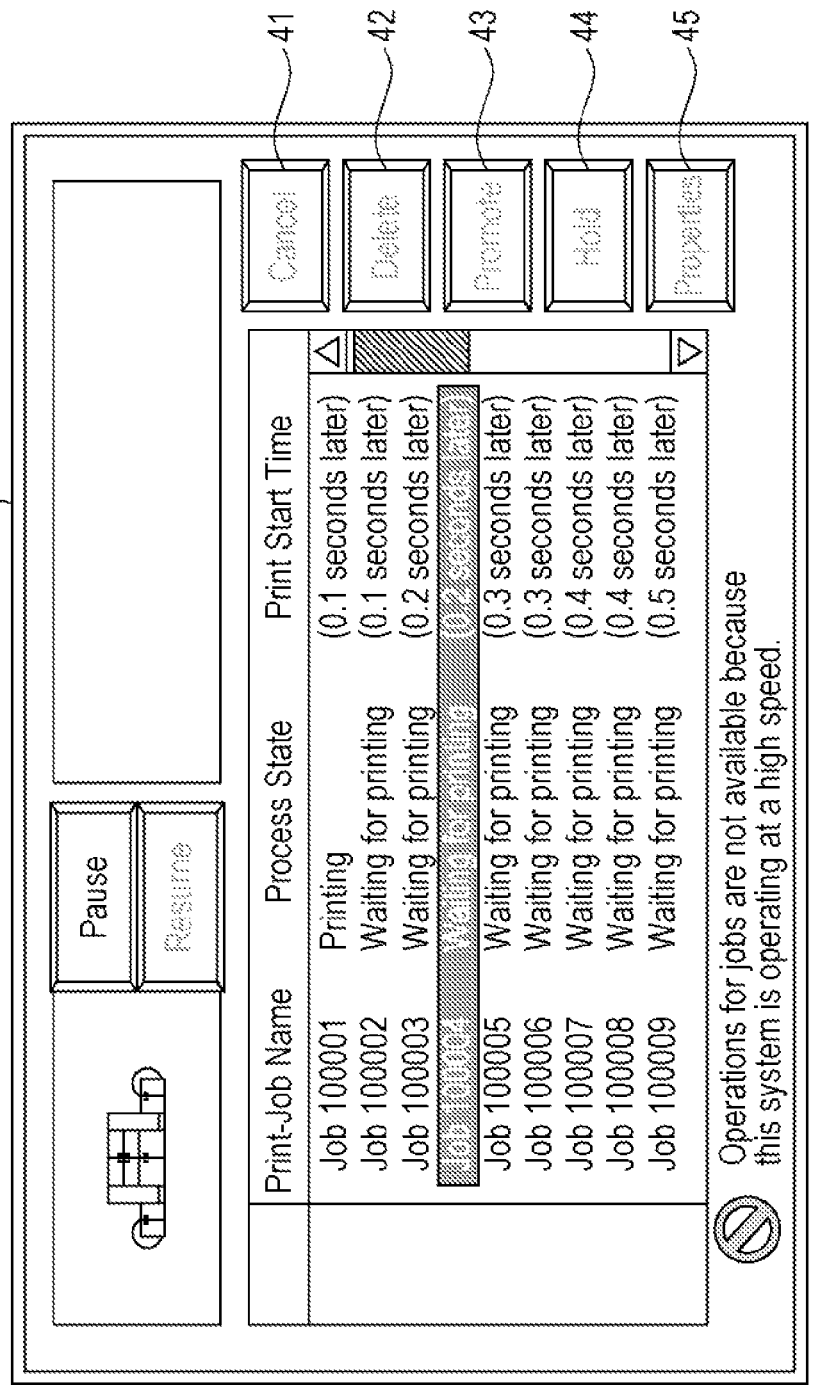
FIG. 11 is an example of a display screen in the case where a print job whose print start time is to occur within the set period of time is selected.
Figure 12:
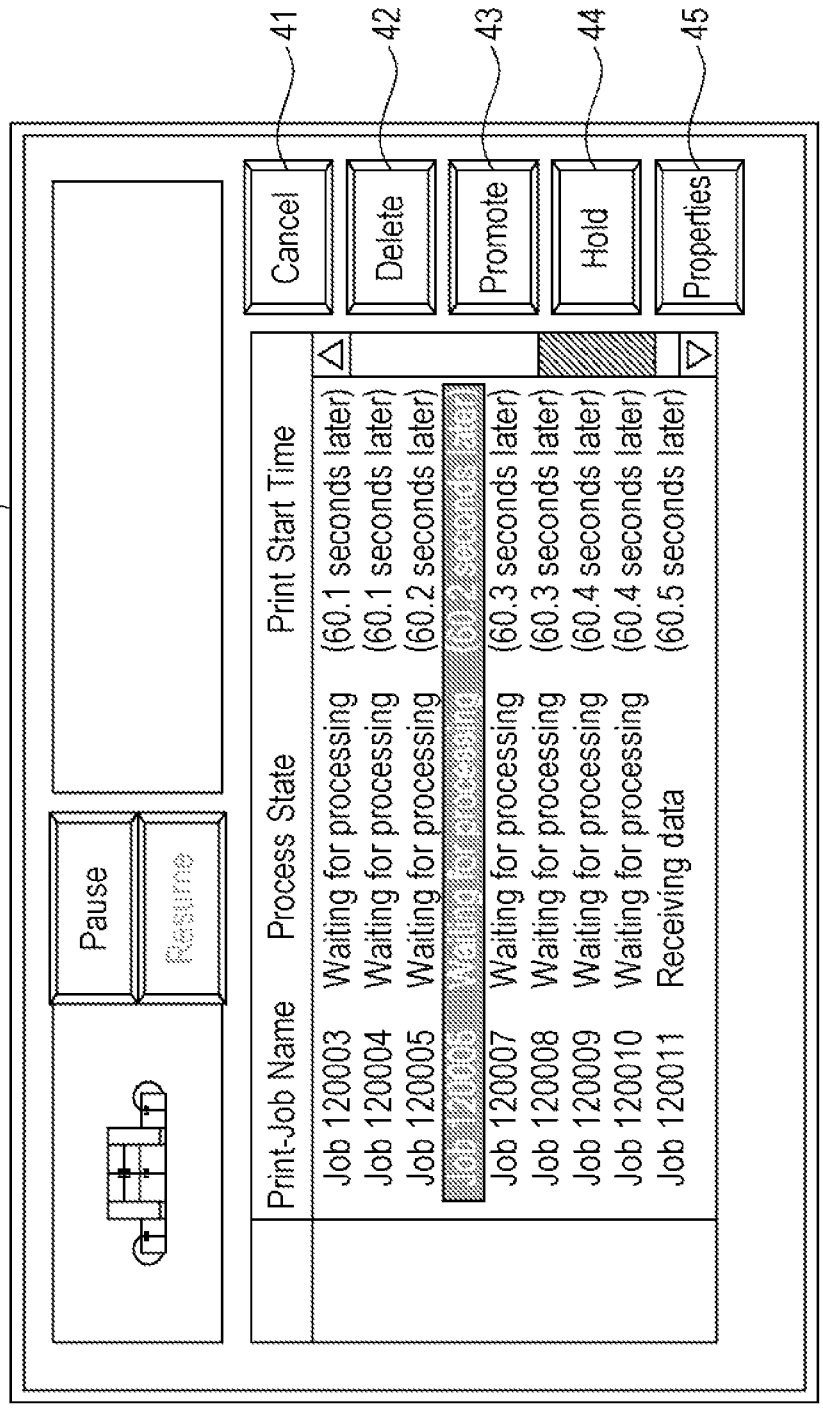
FIG. 12 is an example of the display screen in the case where a print job whose print start time is to occur when or after the set period of time elapses is selected.

Examples of a display screen in the case where display of a display screen of a list of print jobs is performed on the basis of the table illustrated in FIG. 10 are illustrated in FIGS. 11 and 12. In FIGS. 11 and 12, a scrollbar is provided on the side of the display screen, and print jobs that are displayed may be moved by performing an operation on this scrollbar.

In FIG. 11, a print job whose job name is "job 100004" is selected, and the print start time of this print job is 0.2 seconds later. Accordingly, in FIG. 11, the operation buttons 41 to 45 are disabled, and operations for the print job of "job 100004" are not available.

However, in FIG. 12, a print job whose job name is "job 120006" is selected, and the print start time of this print job is 60.2 seconds later. Accordingly, in FIG. 12, the operation buttons 41 to 45 are enabled, and operations for the print job of "job 120006" are available.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control apparatus comprising:
an accepting unit that accepts a print request;
a generating unit that generates, on the basis of a print request accepted by the accepting unit, print data for outputting an image onto printing paper;
a transmission unit that transmits print data generated by the generating unit to a printing apparatus;
a display that displays a list of a plurality of print requests accepted by the accepting unit, together with process states of the individual print requests;
a determination unit that determines whether or not a progress speed that is a speed with which processes based on the plurality of print requests are to be completed is equal to or higher than a set value; and
a display controller that, in a case where an operation instruction unit that is used to instruct performance of a process for a print request selected in the list of the print requests is displayed on the display, when it is determined by the determination unit that the progress speed is equal to or higher than the set value, performs control of disabling the operation instruction unit that is displayed.

2. The print control apparatus according to claim 1, wherein, even when it is determined by the determination unit that the progress speed is equal to or higher than the set value, in a case where only a print request whose process state is a held state which indicates that a print request is held without performing a print process is displayed on the display, the display controller performs control of enabling the operation instruction unit that is displayed on the display.

3. The print control apparatus according to claim 1, wherein the display controller performs control of displaying, on the display, print start times that indicate estimated periods of time to be taken before print processes for individual print requests start, together with the process states of the individual print requests, and, even when it is determined by the determination unit that the progress speed is equal to or higher than the set value, in a case where a print request for which it is necessary to wait a period of time before printing starts, the period of time being equal to or longer than a set period of time, is selected, performs control of enabling the operation instruction unit that is used to instruct performance of an operation for the selected print request.

4. An image forming system comprising:
an accepting unit that accepts a print request;
a generating unit that generates, on the basis of a print request accepted by the accepting unit, print data for outputting an image onto printing paper;
a transmission unit that transmits print data generated by the generating unit to a printing apparatus;
a display that displays a list of a plurality of print requests accepted by the accepting unit, together with process states of the individual print requests;
a determination unit that determines whether or not a progress speed that is a speed with which processes based on the plurality of print requests are to be completed is equal to or higher than a set value;
a display controller that, in a case where an operation instruction unit that is used to instruct performance of a process for a print request selected in the list of the print requests is displayed on the display, when it is determined by the determination unit that the progress speed is equal to or higher than the set value, performs control of disabling the operation instruction unit that is displayed; and
a printing apparatus that outputs, onto printing paper, an image based on print data transmitted by the transmission unit.

5. A non-transitory computer-readable medium storing a program causing a computer to execute a process, the process comprising:
generating, on the basis of an accepted print request, print data for outputting an image onto printing paper, and transmitting the print data to a printing apparatus;
displaying a list of a plurality of accepted print requests together with process states of the individual print requests;
determining whether or not a progress speed that is a speed with which processes based on the plurality of accepted print requests are to be completed is equal to or higher than a set value; and
performing, in a case where an operation instruction unit that is used to instruct performance of a process for a print request selected in the list of the print requests is displayed, when it is determined that the progress speed is equal to or higher than the set value, control of disabling the operation instruction unit that is displayed.

* * * * *